United States Patent [19]
Leposavic

[11] 3,720,938
[45] March 13, 1973

[54] SYSTEM FOR PREVENTING ERRONEOUS DATA OUTPUT SIGNALS FROM AN ELECTRICAL KEYBOARD

[75] Inventor: Wayne V. Leposavic, Saratoga, Calif.

[73] Assignee: Lematex, Inc., Santa Clara, Calif.

[22] Filed: April 19, 1971

[21] Appl. No.: 135,076

[52] U.S. Cl. ..............340/365 S, 200/5 A, 178/17 C, 340/365 E

[51] Int. Cl. ..............H04q 3/00

[58] Field of Search......340/365; 200/5 A; 178/17 C; 179/90 K

[56] References Cited

UNITED STATES PATENTS

| | | | |
|---|---|---|---|
| 3,548,375 | 12/1970 | Maure | 340/365 X |
| 3,506,795 | 4/1970 | Schmidt | 340/365 X |
| 3,600,528 | 9/1969 | Leposavic | 200/5 A |
| 3,120,583 | 2/1964 | Cornell | 340/365 X |
| 3,592,979 | 7/1971 | Redman | 340/365 X |
| 3,576,569 | 4/1971 | Watson | 340/365 |

*Primary Examiner*—John W. Caldwell
*Assistant Examiner*—Robert J. Mooney
*Attorney*—Price, Heneveld, Huizenga & Cooper

[57] ABSTRACT

In a mechanically operated keyboard employing keys each having a multiplicity of electrical switch contacts for providing an encoded electrical signal output corresponding to and uniquely identifying individual key stations, an electrical circuit provides a dummy load across the multiple switch contacts which varies as different keys are actuated in a manner to provide a constant load across the multiple switch contacts. The electrical circuit develops a control signal which can be employed in conjunction with associated circuits to inhibit erroneous data output signals from the keyboard in the event of improper switch closure.

25 Claims, 8 Drawing Figures

INVENTOR.
WAYNE V. LEPOSAVIC
BY Price, Heneveld, Huizenga & Cooper
ATTORNEYS

INVENTOR
WAYNE V. LEPOSAVIC
BY Price, Heneveld, Huizenga & Cooper
ATTORNEYS

INVENTOR
WAYNE V. LEPOSAVIC
BY Price, Heneveld
Huizenga & Cooper
ATTORNEYS

INVENTOR
WAYNE V. LEPOSAVIC
BY Price, Heneveld, Huizenga & Cooper
ATTORNEYS

SYSTEM FOR PREVENTING ERRONEOUS DATA OUTPUT SIGNALS FROM AN ELECTRICAL KEYBOARD

The present invention relates to a mechanical keyboard for producing data output signals particularly useful in computers, and specifically to such a keyboard employing multiple electrical switch contacts associated with individual keys and having an electrical circuit for providing a constant load across the multiple electrical switch contacts as different individual keys are depressed. This invention also relates to the specific circuit utilized with the keyboard.

BACKGROUND OF THE INVENTION

Conventional keyboards are either mechanical or electrical in design. With the advent of computer applications whereby the output signals from a keyboard are coupled directly into various computer terminal equipment, it has become necessary to encode the output signals from the keyboards used in conjunction with the computer equipment. Conventional mechanical keyboards were relatively unsuccessful primarily because of contact bounce of the electrical switches employed or in errors in output signals caused by time differences between the closing of individual switches associated with each key station. Thus, the computer inputs to which the keyboard was coupled, and which were relatively fast reading, would interpret contact bounce and timing lags as an erroneous code or data signal. The keyboard of the present invention, however, employs a unique switch design which has a single movable electrical contact with a plurality of fingers, and a multiplicity of fixed contacts. This design overcomes the difficulties faced by the earlier mechanical keyboards.

Electrical keyboards employing Hall-effect devices, read switches, capacitive devices, or magnetic devices are more reliable than the old mechanical keyboards but are relatively costly. The keyboard of the present invention, however, provides reliability equivalent to the newer electrical keyboards but at a much reduced cost.

I discovered that in an electrical keyboard, when a voltage source is coupled to a multiplicity of switches to provide output signals which are encoded to produce a unique data signal for each key station, a loading problem may arise when different keys are depressed. The load across the voltage source may vary since different numbers of the multiplicity of switches may be closed with differing keys. With the addition of the present circuit, however, as different keys are actuated, the load presented to the voltage source remains constant, thus the voltage at a terminal coupled to the voltage source will be at a predetermined level when all of the switch contacts of each key station are properly closed. If, however, one or more switch contacts of a key station are not closed, the voltage at the terminal will vary from the predetermined level to provide an indication of improper switch closure. This voltage variation can be employed as a control signal to inhibit erroneous signals from being applied to the computer equipment coupled to the keyboard. Thus, by using the circuit of the present invention, the electrical keyboard employing a multiple switching arrangement can be employed with various computer terminal equipment.

SUMMARY OF THE INVENTION

The present invention includes a keyboard comprising a plurality of mechanically operated individual key stations each of which has a plurality of switch contacts which are all closed when the key is actuated. The multiplicity of switch contacts associated with each key station are activated by a voltage source which is coupled by means of the closed switch contacts to a reference potential through individual impedance elements associated with each switch contact. As an individual key is actuated, a predetermined number of these switch contacts are selectively operated in a manner to provide a unique data signal for each key station of the keyboard. Detection means are provided for detecting when all of the switch contacts of any key station are actuated and provides a signal representative of that state. Coupled to the detection means and switch contacts is a control circuit which is selectively operated to apply the unique data signal from any key station to output terminals of the keyboard when all of the switch contacts of a key station are properly actuated.

It is therefore an object of the present invention to provide an improved electrical keyboard system in which mechanical switches are employed to provide a data signal uniquely identifying each key station.

It is a further object of the present invention to improve the operation of the keyboard with externally connected terminal equipment by maintaining the load across the keyboard switches relatively constant as various individual keys are operated.

It is still a further object of the present invention to provide an electrical circuit for providing signals representative of the actuation state of a multiplicity of switch contacts associated with individual key stations.

Another object of the present invention is to provide an electrical circuit which prevents erroneous data output signals from a mechanical keyboard caused by faulty switch closures at individual key stations.

The novel features that are characteristic of the invention are set forth with particularity in the appended claims. The operation of the preferred embodiment of the invention will best be understood by referring to the figures and description thereof in which:

DESCRIPTION OF THE PREFERRED EMBODIMENT

Figure 1:
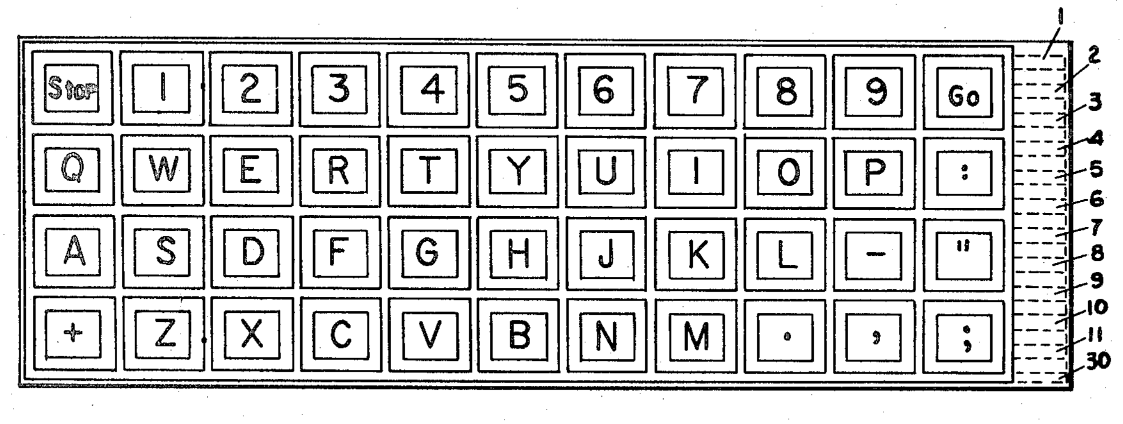
FIG. 1 is a top view of a keyboard embodying the present invention.

In FIG. 1, there is shown a keyboard terminal such as that used in a remote computer terminal which provides an encoded electrical data signal uniquely identifying each key station. The keyboard can be constructed in a manner similar to the keyboard described in a U.S. Pat. No. 3,600,528 entitled MULTIPLE SWITCH CONSTRUCTION filed on Sept. 25, 1969, Ser. No. 860,861 which is assigned to the present assignee. Each key station comprises a switch which has a common flexible contact which comes into contact with a multiplicity of fixed contacts located below the flexible contact and which completes a conduction path from a common bus line coupled to the flexible contact and the various fixed contacts. The fixed contacts are further connected to the electrical circuits which interface with the keyboard by means of the electrical terminals shown by the reference numerals 1–11 and 30 in FIG. 1. A detailed view of one of the keys is shown in FIG. 2, which shows the construction of the multiple contact switch used in an individual key station.

Figure 2:
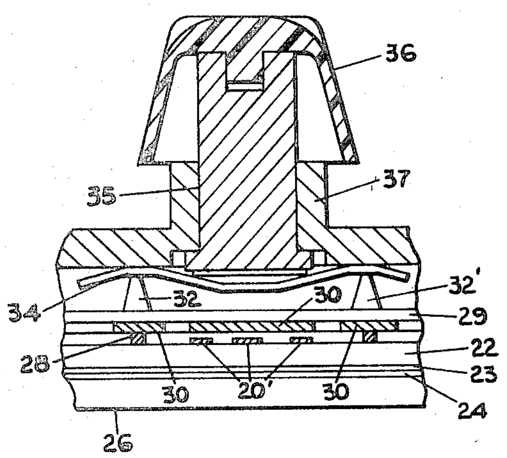
FIG. 2 is a cutaway side view of an individual key station including flexible switch contacts and fixed switch contacts.

In FIG. 2, the fixed contacts 20 are mounted on the upper surface of a printed circuit board 22 which has an electrical circuit 23 printed on its lower surface. The electrical circuit provides a connection to each of the fixed contact elements and couples them to the various terminals designated by the reference numerals 1–11 and 30 in FIGS. 1, 4 and 5. An insulating layer 24 is interspersed between the printed circuit board 22 and a backing material 26.

Lower spacers 28 separate the movable contacts 30 from the fixed contacts 20. The movable contacts can be fabricated from a flexible conducting material such as beryllium copper. A flexible insulating material 29 such as neoprene rubber is bonded to the upper surface of the movable contact 30. Assembly 29, 30 is separated from a return spring 34 by means of upper spacers 32, 32'. A key 36 is mechanically coupled to the return spring 34 by means of a plunger 35 mounted in guide plate 37. As key 36 is depressed, the plunger 35 moves downwardly to compress the return spring 34 such that it comes into contact with the insulating material 28 and pushes the movable contact 30 downwardly such that it contacts the fixed contacts 20, thereby completing a conduction path between the movable contact 30 and the fixed contacts 20.

Figure 3:
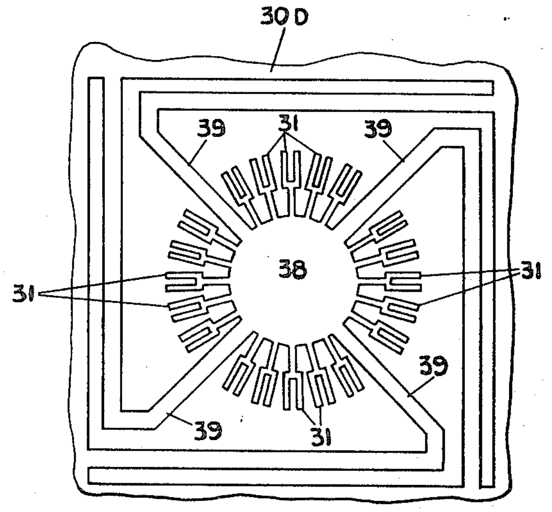
FIG. 3 is a top view showing in detail the construction of a flexible switch contact which can be used in the key station shown in FIG. 2.

FIG. 3 is a detailed view showing the construction of a movable and flexible contact 30D which may be employed in a key assembly such as that shown in FIG. 2 for the key station which corresponds to the letter D for example. The movable contact includes a center area 38 which is contacted by the return spring 34 of FIG. 2 to downwardly move the center portion 38 by means of the flexible legs 39. Attached to the center portion 38 are a plurality of fork-like contact fingers 31. As the center portion 38 is downwardly depressed, the contact fingers come into contact with the various fixed contacts of the assembly shown in FIG. 2, and make electrical contact therewith. A detailed description of the operation of the movable contact 30D to improve the electrical connection between contacts 20 and 30 in FIG. 2 is presented in a co-pending application entitled MULTIPLE SWITCH CONSTRUCTION filed on Apr. 16, 1972, Ser. No. 134,715 which is also assigned to the present assignee.

Figure 4:
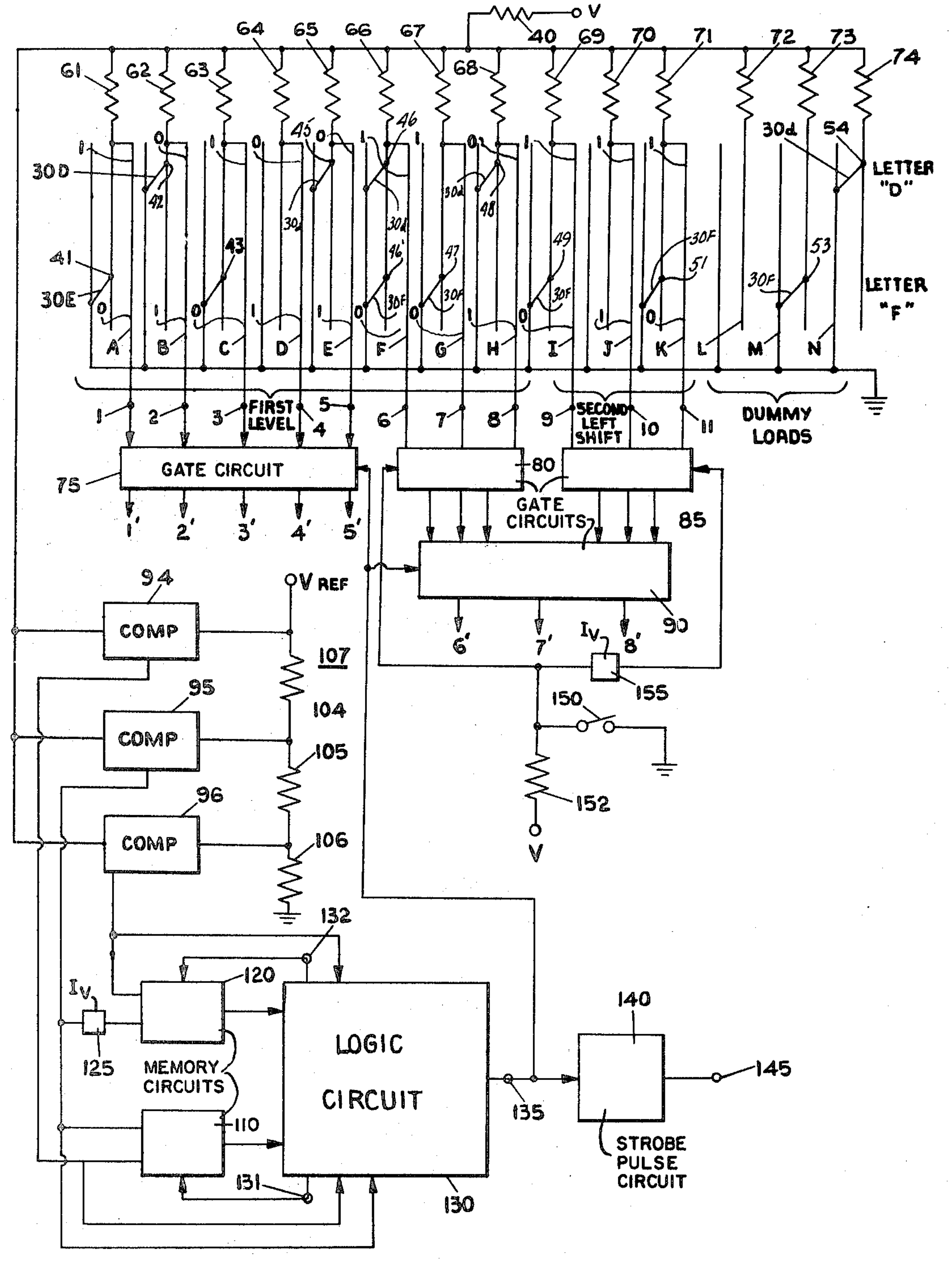
FIG. 4 is an electrical circuit diagram partially in block diagram form of the electrical circuit employed to provide a unique code signal for each individual key station.
Figure 5:
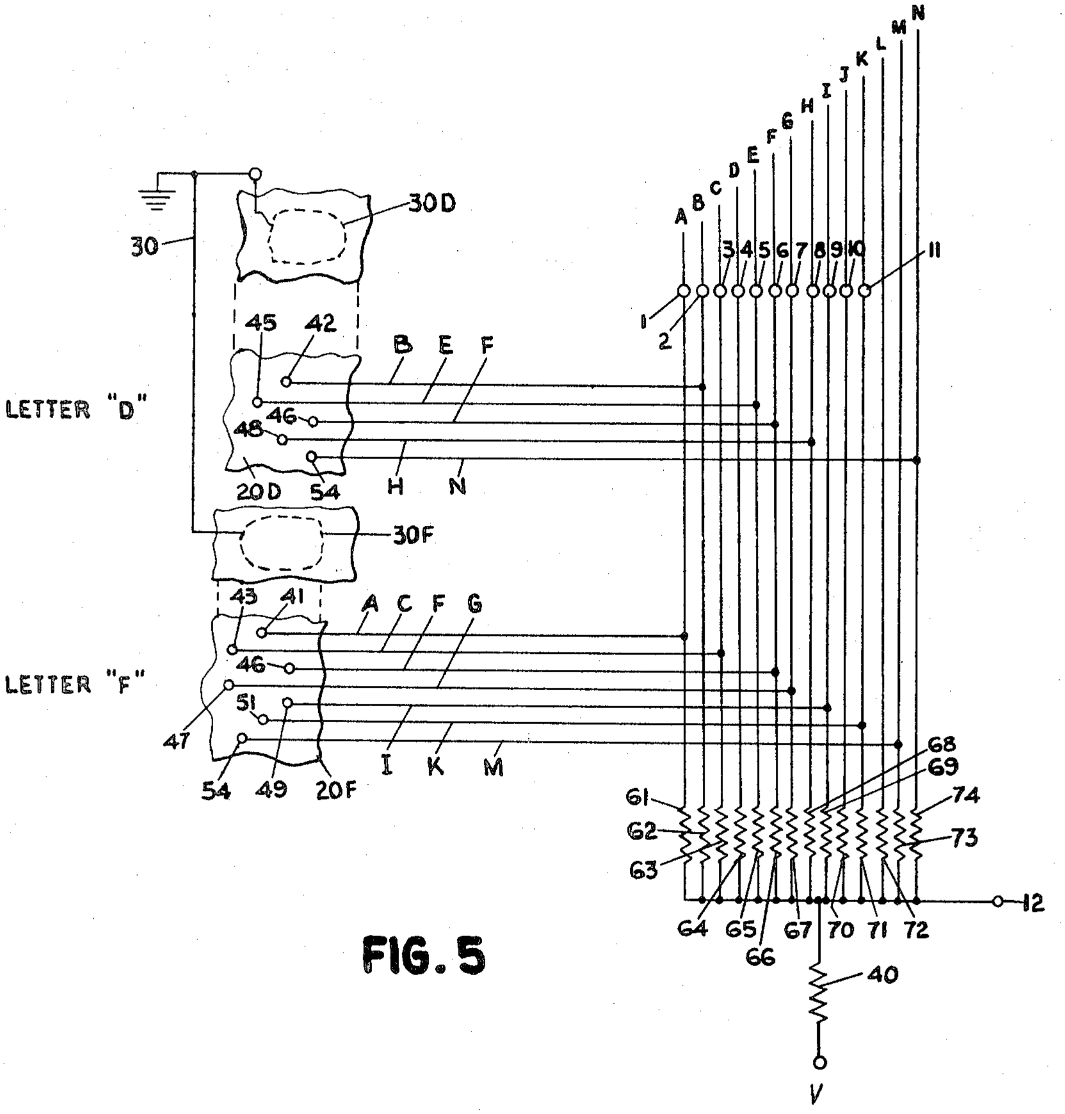
FIG. 5 is a wiring diagram showing the interconnection of the fixed key switch contacts for the letter D key station and the letter F key station and showing their interconnection to the gate circuits shown in FIG. 4.

Referring now to FIGS. 3, 4 and 5, a description of the flexible electrical contact 30 and its relation to the fixed electrical contacts will be described. It is noted that each key station will have a movable flexible contact 30 which is substantially identical to that shown in FIG. 3. Each individual key station will, however, have a different array of fixed contacts (20 in FIG. 2) which are contacted by the movable contact 30 which is coupled to ground. As a key station is actuated, contact 30 will complete a circuit path from the voltage source V through a resistor 40 to one or more of the load resistors 61 through 74 to ground as shown in FIGS. 4 and 5. FIG. 5 schematically illustrates the switching mechanism of FIG. 4 in relation to the keyboard construction previously described. In FIG. 5 it can be seen that the array of fixed contacts 20D for the key station D is different than the array of fixed contacts 20D for the key station F. The connection of these contact arrays to the conductors A – N is also shown in FIG. 5.

As an individual key is actuated a data signal is produced on the conductors A – K which is coupled to the gate circuits 75, 80 or 85 shown in FIG. 4. For the letter D, for example, the key station will include fixed contacts 42, 45, 46, 48 and 54 and complete the electrical circuit from the voltage source V to ground. Thus, the data signal 10110010111 will be impressed across conductors A – K as shown in FIG. 4 to provide a data signal at terminals 1 – 11 which uniquely identifies the key station for the letter D. (A "0" indicates the particular conductor has no voltage on it due to the closure of one of the switch contacts, while a "1" indicates a voltage remains on the conductor since no switch contact has been closed.) It is noted that conductors A – N and terminals 1 – 11 can be formed on the printed circuit 23 associated with the keyboard as shown and described with reference to FIGS. 1 and 2.

As the key corresponding to the letter F is depressed, movable contact 30F in FIGS. 4 and 5 will come into contact with the fixed contacts 41, 43, 46, 47, 49, 51 and 54 to provide a completed electrical circuit from the voltage source V to ground. A data signal 01011001010 as shown in FIG. 4 uniquely identifying the key station corresponding to the letter F will thereby be applied to output terminals 1 – 11 of the keyboard. This data signal is then applied to the gate circuits 75, 80 and 85 of FIG. 4.

In FIG. 4, terminal 12, which is electrically coupled to the junction of each resistor 61 – 74 with resistor 40, is additionally coupled to a first comparator 94, a second comparator 95 and a third comparator 96. A voltage reference supply $V_{ref}$ in the figure, is coupled to ground by means of a voltage dividing network 107 comprising resistors 104, 105 and 106, serially coupled from the voltage reference supply to ground. The reference supply is coupled directly to comparator 94 whereas comparator 95 is coupled to the junction of resistors 104 and 105, and comparator 96 is coupled to the junction of resistors 105 and 106. The output of comparator 94 is coupled to a first memory circuit 110 and to logic circuit 130. The output from comparator 95 is coupled to the memory circuit 110, to the logic circuit 130, and to a second memory circuit 120 by means of an inverter stage 125. Comparator 96 has an output which is coupled to the second memory circuit 120 and to logic circuit 130. Logic circuit 130 includes a first terminal 131 which is coupled to the first memory circuit 110, and a second terminal 132 which is coupled to the second memory circuit 120. An output terminal 135 on logic circuit 130 is also coupled to the gate circuits 75 and 90. A shift key 150 is provided which is coupled across a resistor 152 and a voltage source V in the figure. The voltage at the junction of switch 150 and resistor 152 is applied to gate circuit 80, and through an inverter stage 155 to gate circuit 85.

Comparators 94, 95 and 96 can be of conventional design. They compare the voltage at terminal 12 with the voltage applied to them from the voltage divider network 107 and provide an output signal indicative of this comparison to the memory circuits 110 and 120 and to the logic circuit 130. The memory circuits can be bi-stable multivibrators which remain in a given state until triggered by an input signal from one of the comparators. Inverter stages 125 and 155 can be single stage amplifiers. The logic circuit 130 may include a gated amplifier and circuit means for providing reset pulses at terminals 131 and 132. The output of the gated amplifier in the logic circuit may be coupled directly to output terminal 135. A contact bounce integrating circuit for delaying the signal from the comparators to permit vibrations or bounces of the switch contacts to settle down may be coupled between the comparators and the gated amplifier in the logic circuit 130 to prevent activation of the gated amplifier in the logic circuit until these vibrations or bounces have diminished.

Each of the gate circuits 75, 80, 85 and 90 can be gated amplifiers which respond to signals applied from either the logic circuit 130 or the shift key 150 to their input control terminals to be operative to couple the applied data signals to their respective output terminals. Strobe pulse circuit 140 may include a pulse generator which is triggered by signals from output terminal 135 of the logic circuit 130 and appropriate pulse shaping means to provide the desired pulse shape at output terminal 145. A detailed description of the operation of the circuitry of FIG. 4 is now presented.

OPERATION

In operation as different keys are actuated, a different number of the load resistors 61 – 71 will be coupled to ground by means of the multiple key contacts associated with each key station. For example, the letter D will couple four of these resistors to ground as shown in FIG. 4 whereas the letter F will couple six of these resistors to ground. Since resistors 61 – 71 are in a preferred embodiment, each equal to 1,000 ohms, the variable number of these resistors being coupled across terminal 12 to ground to provide the necessary data signal to the gate circuits, will simultaneously tend to produce a variable voltage at terminal 12. With the addition of the dummy load resistors 72, 73 and 74 which can be coupled in circuit by means of one or more contacts associated with each key station; the total impedance across terminal 12 can be maintained constant as different keys are actuated. This is accomplished by coupling in circuit, in a predetermined manner, one or more of these load resistors during the time when all of the switches associated with various individual key stations are closed. For example, in the preferred embodiment, resistor 72 was 1,000 ohms, resistor 73 was 500 ohms; and the dummy load resistor 74 was 250 ohms. When the letter D is actuated, the resistors coupled to ground present a total parallel impedance of 250 ohms. In parallel with this 250 ohms is resistor 74 which is coupled in circuit by means of the closure of switch 54 to provide a total impedance of 125 ohms which is coupled from terminal 12 to ground by means of the actuated key. Likewise, when the key corresponding to the letter F is actuated, six 1,000 ohm resistors are coupled in parallel to provide the data signal while resistor 73 which is 500 ohms is coupled in parallel with these resistors by means of the closure of switch 53. Thus, the total combination of the load resistances and the dummy load resistor 73, again, presents a total impedance of 125 ohms across terminal 12. One or more of the dummy load resistors can, likewise, be selected to provide a constant impedance (125 ohms in the preferred embodiment) as each key station of the keyboard is actuated. Since the dummy load resistors chosen in the preferred embodiment are an integral division of the resistance values used for the encoding resistors only three dummy load resistances need be employed to provide the necessary resistance combinations for maintaining the impedance across terminal 21 constant. In other embodiments, it may be necessary or desirable to use any number of dummy load resistors.

It is seen that with the incorporation of the constant impedance feature of circuit shown in FIG. 4, terminal 12 will be at a first potential when no key is actuated or at a second predetermined potential when a key is actuated and when all of its switche contacts are properly closed. Any voltage other than these two voltage levels present across terminal 12 can thereby be employed as a control signal which is indicative of the condition where less than all of the switches associated with the given key station have been closed, or more than one key has been activated. This control signal can be employed to inhibit the output of the data signals from the key station at terminals 1′ – 7′ and P when all of the switches are not closed and an erroneous output signal would result. This is accomplished by means of the comparators and memory and logic circuits in conjunction with the keyed gate circuits 75 and 90. A description of the operation of these circuits to prevent false signals from being applied to the interface equipment is now presented.

As a key is actuated and the first switch associated with the multiple switch contacts of the key is closed, the first comparator 94 will detect a relatively slight voltage decrease at terminal 12 and will operate to provide an enabling signal which is applied to the memory circuit 110 and conditions the circuit 110 to allow an enabling signal to be developed by the logic circuit 130 when comparator 95 develops an output signal. As all of the switches associated with the individual key station close, thereby fixing the voltage at terminal 12 at its predetermined level, comparator 95 will detect this change in voltage level and provide a signal to memory unit 110 which, in turn, is activated thereby to produce an enabling signal which is applied to the logic circuit 130. Thus, it is seen that logic circuit 130 will be activated by the signal from memory circuit 110 only when all of the switches associated with an individual key station are properly closed. When this occurs, logic circuit 130 in turn products an enabling signal at its output terminal 135 which is applied to keyed gate circuits 75 and 90.

Gate circuits 75 and 90 will thereby be activated to couple the data signal from terminals 1 – 11 to output terminals 1' – 7', and P. Depending upon the position of key shift switch 150, terminals 6 – 8 will be coupled to terminals 6', 7' and P, or terminals 9 – 11 will be coupled thereto. When switch 150 is open, the resulting voltage at the junction of switch 150 and resistor 152 will activate gate 80 thereby coupling the signals applied to gate 80 to gate 90. Simultaneously, the inverted signal from this junction will inhibit gate 85. When the shift key switch 150 is closed, however, the inverse is true. Gate 80 will be inhibited whereas the data signals coupled to gate 85 which is now activated, will be coupled to the gate 90 and thereby to the output terminals 6', 7' and P if gate 90 is simultaneously activated by a signal from the logic circuit 130.

The enabling signal from the logic circuit is also applied to the strobe pulse circuit 140 which responds to this signal to apply an output pulse at terminal 145 which can be used for various timing applications and is commonly referred to as a strobe pulse.

When the key is released, as the first of the multiplicity of switch contacts open, the voltage at terminal 12 tends to increase. Comparator 95 detects this increase in voltage and couples a different output signal to the first memory circuit 110 thereby inhibiting the circuit 110 from providing an enabling signal to the logic circuit 130. Likewise, this signal from comparator 95 is coupled to the second memory circuit 120 by means of the inverter stage 125 in a manner to operate the second memory circuit 120 to produce an inhibiting output signal which is coupled to the logic circuit 130. The logic circuit 130 responds to this inhibiting signal and ceases providing the enabling signal of terminal 135 to gate circuits 75 and 90 and to circuit 140. When all of the switches have opened, comparator 94 detects the increased voltage level at terminal 12 and couples a signal to the logic circuit which responds to produce a reset pulse at terminals 131 and 132. These signals are applied to the memory circuits 110 and 120 to reset them in their quiescent condition in which they await further signals from the comparator circuits.

Since memory circuit 110 operates when all the switches are closed and since memory circuit 120 operates on the first switch to open thereby inhibiting an output signal from the keyboard, and since the two memories are reset only when all of the switches are open; a form of hysteresis is achieved requiring all of the switches of a key to be open before a new cycle can be started by actuating the same or other keys.

If more than one key is accidentally closed simultaneously the voltage at terminal 12 will be somewhat lower than the predetermined fixed voltage. Comparator 96 will detect this condition to produce an inhibit signal which is applied to the memory circuit 130 to prevent the logic circuit from enabling the gate circuits. This prevents a garbled code or data signal from being sent by the keyboard.

Thus, it is seen that the preferred embodiment described provides a keyboard which prevents false or garbled electrical signals from being applied to the computer or other terminal equipment to which it is interconnected. It will be apparent to those skilled in the art that various modifications of the electrical circuits can be employed which will fall within the scope of the present invention.

For example, instead of coupling the flexible switch contacts to ground thereby providing a "0" signal to the gate circuits when actuated, it is possible to couple the switch contacts between terminal 12 and the various load resistors and couple the opposite ends of these resistors to ground. The data code signal would then be the inverse of the signal provided by the present system. Also, the logic and memory circuits can be designed to incorporate a two-key roll over feature such that if two keys are sequentially actuated but have an overlap period where both keys are simultaneously actuated, the keyboard will provide consecutive data output signals corresponding to the sequentially actuated key stations.

Figure 6:
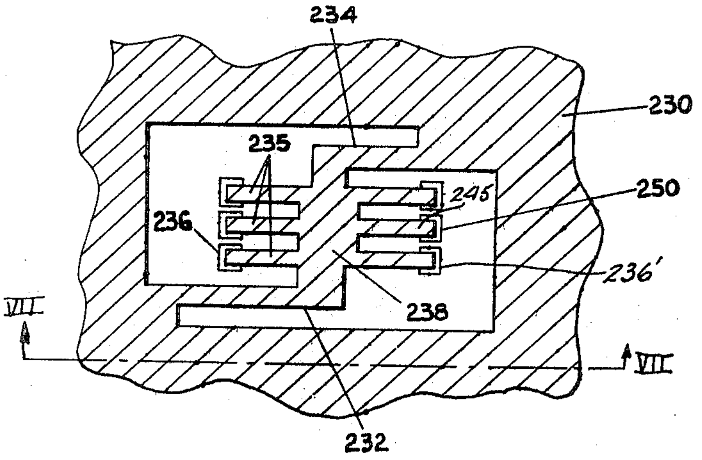
FIG. 6 is a top view of an alternative embodiment of a flexible switch contact which could be employed in place of the contact shown in FIG. 3.
Figure 7:
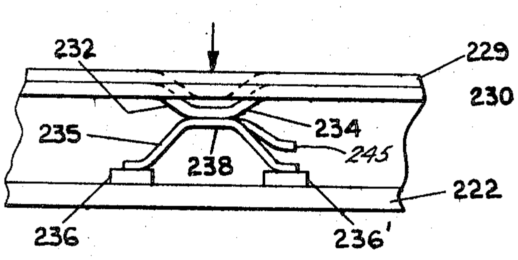
FIG. 7 is a front view of the contact shown in FIG. 6 taken along the view line 7—7.
Figure 8:
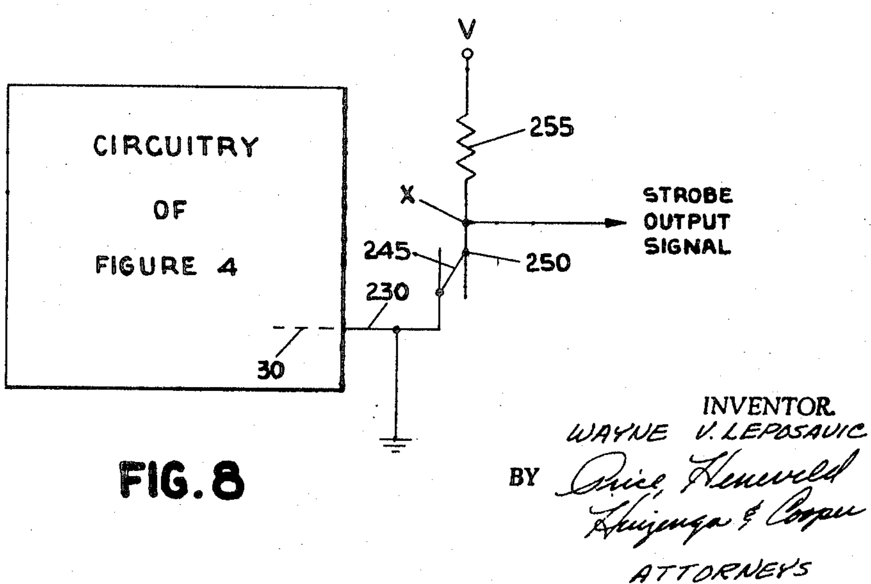
FIG. 8 is a schematic circuit diagram partially in block form showing an application of the contact illustrated in FIGS. 6 and 7 to provide a strobe output signal.

In addition to these modifications, a strobe output signal can be directly developed by an embodiment of the multiple contact switches as shown in FIGS. 6 – 8. In FIG. 6, a flexible contact comprises a conductive material such as beryllium copper and has a center portion 238 with a multiplicity of fingers 235. Although only six fingers are shown, a greater number could be incorporated. The central portion 238 is mounted to the main body of the contact 230 by means of arms 232 and 234 which allow the central portion vertical freedom of motion. Under each contact finger, there is a fixed contact (for example 236, 236') mounted on a circuit board 222 and with which the individual contact fingers will make electrical contact when the central portion 238 of the flexible contact is actuated by means of a key station assembly similar to that shown in FIG. 2. A flexible insulating material 229 covers the conductive material 230 and provides a sealed protective cover for the keyboard assembly. As shown in FIG. 7, the fingers 235 are bent downwardly from the plane of the material 230 from which they are formed. The contact fingers 235 are bent downwardly an equal amount with the exception of one of the contacts 245 which is bent down a lesser amount. Contact finger 245 will mechanically and electrically contact its associated fixed contact 250 at some later moment as motion is imparted to the flexible contact in the direction illustrated by the downwardly pointing arrow in FIG. 7. Since this contact will make only after the remaining contacts have completed their electrical connection to the associated fixed contacts, it can be employed to provide a strobe pulse signal which is indicative of the condition that the remaining contacts have been made.

The circuitry utilized to provide such a strobe output signal in conjunction with the strobe contact 245 and its associated fixed contact 250 is shown in FIG. 8. The flexible contact 230 having a strobe contact 245 may be included in the keyboard assembly and circuit shown in FIG. 4. This is represented in FIG. 8 by the junction of the flexible contact 30 in FIG. 4 which corresponds electrically to contact 230 shown in FIGS. 6 – 8. If so incorporated, the input signal to the strobe circuit 140 shown in FIG. 4 would be directly from the circuit of FIG. 8 rather than from terminal 135 as shown in FIG. 4. The remaining circuitry could remain the same as described with reference to FIG. 4 and the purpose of the strobe contact 245 would only be to provide a strobe pulse to the interconnected terminal equipment.

As a key station is actuated, the finger contact portions 235 of FIGS. 6 and 7 will make to provide a data output signal which is applied to gate circuits as shown in FIG. 4. As the strobe pulse contact finger 245 electrically contacts its associated fixed contact 250, the voltage at terminal X in FIG. 8 which is coupled to a voltage source V by means of a resistor 255, will decrease from a predetermined voltage to zero voltage since the flexible contact 230 is grounded. This change of voltage at terminal X in FIG. 8 provides a logic "0" strobe output signal which can be coupled to the input of circuit 140 in FIG. 4.

In some applications incorporation of a strobe pulse contact finger as shown in FIGS. 6 and 7 may eliminate the need for the comparator circuit 95 shown in FIG. 4. In such an application the strobe output signal developed by the strobe contact could be employed to activate the gate circuits 75, 80, 85, and 90 shown in FIG. 4 thereby bypassing the logic circuit 130. The other comparators and logic circuit could still be used to prevent false data signals when two keys are simultaneously actuated however. While the use of the last-to-make strobe contact in conjunction with the multiplicity of flexible contact fingers may simplify the circuitry of FIG. 4, some sacrifice in the accuracy of the data output signal may result. Since the strobe pulse signal would be developed regardless of whether in fact all of the other flexible switch contacts has electrically contacted their associated fixed contacts, it would be possible for a false data signal to appear at the keyboard output. The flexible contact arrangement shown in FIGS. 6 and 7 can be employed in less critical applications however to provide an inexpensive mechanical keyboard which will provide a data output signal only when the last-to-make strobe contact finger had closed thereby ensuring in most cases an accurate data signal.

Other modifications to the circuitry as described in this application will also fall within the scope of the present invention. It may be possible, for example, to monitor the current through resistor 40 to provide a control signal instead of employing the voltage at terminal 12. In other applications the load on the switches may comprise lines which are directly coupled to gate circuits rather than employing individual load resistors as shown. Likewise, the controlled gate circuits shown in FIG. 4 may be located at a computer terminal other than the keyboard terminal, in such case the strobe output signal can be employed to gate the controlled gate circuits to ensure that the computer is reading an accurate data output signal from the keyboard.

The embodiments of the invention in which an exclusive property or privilege is claimed are defined as follows:

1. A keyboard assembly comprising:

a plurality of key stations;

multiple switch contact means associated with each of said key stations;

means for coupling a source of operating potential to said switch contact means;

detection means coupled to said switch contact means for detecting when all of said switch contact means of an individual key station are actuated and for providing a signal representative of this state; and control means coupled to said detection means and to said switch contact means, said control means responsive to said signal to provide an output signal from said keyboard when all of said switch contact means of an individual key station are actuated.

2. A keyboard assembly as defined in claim 1 wherein said detection means includes an electrical circuit for maintaining the load across said source of operating potential substantially constant as each individual key station is actuated and all of its said switch contact means are actuated.

3. A keyboard assembly as defined in claim 2 wherein said detection means further comprises means for detecting the voltage across said electrical circuit as a key station is actuated and for providing an output signal when said voltage reaches a predetermined level indicating that all of said switch contact means of said key station are actuated.

4. A keyboard assembly as defined in claim 1 wherein said control means comprises a controllable gate circuit having input terminals, output terminals and a control terminal.

5. A keyboard assembly as defined in claim 4 wherein said input terminals of said controllable gate circuit are coupled to said switch contact means, and said control terminal is coupled to said detection means, and wherein said controllable gate circuit is responsive to signals from said detection means to couple signals applied to its input terminals, to its output terminals.

6. A keyboard assembly as defined in claim 2 wherein said electrical circuit comprises a variable impedance operatively coupled in circuit across said source of operating potential by switch contacts associated with at least one of said key stations.

7. A keyboard assembly as defined in claim 6 wherein said variable impedance comprises at least one fixed impedance and switching means associated with a key station to selectively couple said fixed impedance into or out of said circuit as a key associated with said key station is actuated.

8. A keyboard assembly as defined in claim 7 wherein said variable impedance comprises a multiplicity of fixed impedances each of which have switching means associated therewith and which are selectively actuated by the actuation of various key stations in a manner to couple in circuit at least one of said fixed impedances thereby maintaining the load across said source of operating potential substantially constant as various keys associated with said keyboard are actuated.

9. A keyboard assembly as defined in claim 8 wherein each key station includes a switch having multiple contacts which operate when a key associated with said key station is actuated thereby coupling in circuit between said source of operating potential and a reference potential at least one load impedance thereby developing a data signal identifying said key station.

10. A keyboard assembly as defined in claim 9 wherein said variable impedance comprises shunt impedance means selectively coupled across said source of operating potential by the closing of switch contacts associated with at least one of said key stations in a manner to combine with the load presented by said load impedance to provide a substantially constant total load impedance across said source of operating potential as keys of various key stations are actuated.

11. An electrical keyboard assembly comprising a plurality of key stations;

an electrical terminal;

a plurality of switch contacts common to said terminal and associated with each key station of said keyboard;

each key station further including a multiplicity of other switch contacts;

said switch contacts and other switch contacts being coupled to an array of resistances and to input terminals of controllable gate circuits as each individual key is actuated and predetermined ones of said switch contacts and other switch contacts are actuated, a unique electrical data signal is developed at said input terminals of said gate circuits whose output is coupled to keyboard output terminals associated with said keyboard;

means for preventing false signals from each of said key stations due to improper contact between said switch contacts and any one of said predetermined ones of said other switch contacts comprising:

detecting means coupled to said electrical terminal for providing a control signal as said multiplicity of other switch contacts is electrically coupled to said common switch contact; and circuit means for applying said control signal to said gate circuit to selectively operate said gate circuit in a manner to prevent the application of false signals to said keyboard output terminals.

12. An electrical keyboard as defined in claim 11 and further including:

second detecting means coupled to said electrical terminal for providing a second control signal when all of said other switch contacts are electrically coupled to said common switch contact, and circuit means for applying said second control signal to said controllable gate circuit thereby activating said gate circuit such that a unique data signal is applied to said keyboard output terminals.

13. An electrical keyboard circuit as defined in claim 12 and further including:

third detecting means coupled to said electrical terminal for providing a third control signal when more than one key of said keyboard are simultaneously depressed, and circuit means for applying said third control signal to said controlled gate circuit to inhibit said gate circuit from applying a signal to said keyboard output terminals.

14. The electrical keyboard of claim 11 in which a predetermined number of said other switch contacts are connected to binary load resistors.

15. An electrical keyboard assembly comprising a plurality of key stations;

an electrical terminal;

a plurality of common switch contacts coupled to said terminal and associated with each key station of said keyboard;

said switch contacts coupled to an array of resistances and to input terminals of controllable gate circuits by means of other switch contacts associated with each key such that as each individual key is depressed and all of said switch contacts of said individual key are actuated, a unique electrical code signal is developed at said input terminals of said gate circuits whose output is coupled to keyboard output terminals associated with said keyboard;

means for preventing false signals from each of said key stations due to improper contact between said common switch contacts and said other switch contacts comprising;

an electrical circuit for maintaining the load on said electrical terminal substantially constant as each individual key is actuated and all of its said switch contacts are actuated;

first detecting means coupled to said terminal for detecting the load on said terminal depending upon the number of said switch contacts which are actuated and for developing a control signal representative of the load on said terminal;

and circuit means for applying said control signal to said gate circuit to inhibit said gate circuit from applying a signal to said keyboard output terminals when said switch contacts are not all actuated.

16. An electrical keyboard as defined in claim 15 and further including:

second detecting means coupled to said electrical terminal for providing a second control signal when all of said other switch contacts are electrically coupled to said common switch contact, and circuit means for applying said second control signal to said controllable gate circuit thereby activating said gate circuit such that a unique code signal is applied to said keyboard output terminals.

17. An electrical keyboard circuit as defined in claim 15 and further including:

third detecting means coupled to said electrical terminal for providing a third control signal when more than one key of said keyboard are simultaneously depressed, and circuit means for applying said third control signal to said controlled gate circuit to inhibit said gate circuit from applying a signal to said keyboard output terminals.

18. An electrical keyboard for generating character representative data signals as keys of the keyboard are actuated comprising:

a base including a plurality of switch locations positioned in an array thereon, each switch location including a plurality of fixed electrical contacts;

a plurality of movable electrical contacts integrally formed in a sheet of conducting material supported in spaced relationship to said base such that said contacts align with said switch locations, each movable switch contact including a contact member movable to contact said fixed contacts of an aligned switch location when the associated key of said keyboard is actuated;

a first array of resistors each having first and second terminals wherein selected ones of said first terminals are coupled to selected ones of said fixed contacts for each switch location and said second resistor terminals are commonly coupled;

a voltage source coupled to said resistors such that as key stations are actuated, a data signal is generated across said first array of resistors which uniquely identifies each key station, wherein the voltage across said resistors is subject to vary as different key stations are actuated due to variable loading on said voltage source;

a second array of resistors each having first and second terminals wherein said second terminals are coupled to said second terminals of said first array of resistors and means for selectively coupling predetermined ones of said first terminals of said second array of resistors in circuit with said voltage source to maintain the voltage across said first array of resistors at a predetermined level as different key stations are actuated and all of the switch contacts of a key station are closed, and circuit means coupled across said first array of resistors for preventing erroneous data signals by providing an output signal only when said voltage is at said predetermined level.

19. An electrical circuit as defined in claim 18 wherein said means for selectively coupling predetermined ones of said first terminals of said second array of resistors in circuit with said voltage source includes means coupling predetermined ones of said first terminals of said second array of resistors to fixed contacts of at least some of said individual key stations such that as a key station is actuated, predetermined resistors of said second array of resistors are coupled in circuit with said voltage source to maintain the load thereon relatively constant as different key stations are actuated.

20. An electrical circuit as defined in claim 19 wherein said electrical keyboard includes a plurality of data output terminals, and means for coupling said output terminals to fixed contacts of each key station.

21. A circuit as defined in claim 20 wherein said coupling means comprises keyed gate circuits having input terminals coupled to said fixed contacts and output terminals coupled to said data output terminals, and further including terminal means for applying a keying signal to said gate circuits which responds thereto to couple data signals applied to said input terminals to said output terminals.

22. An electrical circuit as defined in claim 21 wherein said circuit means includes means for detecting the voltage across said first array of resistors and for developing a keying signal applied to said gate circuits when said voltage is at said predetermined voltage level.

23. An electrical circuit as defined in claim 22 and further including a strobe pulse generator coupled to said detecting and developing means and responsive to a keying signal therefrom to generate a strobe output signal.

24. An electrical keyboard for generating character representative data signals as keys of the keyboard are actuated comprising:

an insulated circuit board including a plurality of switch locations positioned in an array thereon, each switch location including a plurality of fixed electrical contacts;

a plurality of movable electrical contacts integrally formed in a sheet of conducting material supported in spaced relationship to said circuit board such that said areas align with said switch locations, each movable switch contact including a plurality of contact arms movable to contact said fixed contacts of an aligned switch location as a key of said keyboard is actuated, wherein each movable switch contact includes a strobe contact which is actuated only after all of the remaining contacts of said individual switch means are actuated, means for applying a source of operating potential to said switch contacts to provide an electrical data signal at keyboard output terminals which uniquely identifies a key station as said key station is actuated, and circuit means coupled to said strobe contact for providing a strobe output signal when said strobe contact is actuated.

25. An assembly as defined in claim 24 wherein said plurality of contact arms are formed at a predetermined angle relative to the plane of the material, and wherein said strobe contact comprises a contact finger which is formed at a different angle from said plane of said flexible conducting material to make electrical contact with its associated fixed electrical contact only when the remaining movable contacts have contacted their associated fixed contacts.

* * * * *